United States Patent [19]

Dehennau et al.

[11] Patent Number: 5,703,160

[45] Date of Patent: Dec. 30, 1997

[54] BIODEGRADABLE MOULDING COMPOSITIONS COMPRISING A STARCH, A BIODEGRADABLE POLYESTER, AND A SALT OF A HYDROXYCARBOXYLIC ACID

[75] Inventors: Claude Dehennau; Thierry Depireux, both of Waterloo, Belgium; Guy Fleche, Hazebrouck, France; Serge Gosset, Lestrem, France; Didier Videau, Lille, France

[73] Assignees: Solvay S.A., Brussels, Belgium; Roquette Freres, Lestrem, France

[21] Appl. No.: 91,368

[22] Filed: Jul. 15, 1993

[30] Foreign Application Priority Data

Jul. 15, 1992 [BE] Belgium ................................ 92.00656
Jul. 15, 1992 [FR] France ................................. 92 08730

[51] Int. Cl.⁶ ........................... C08G 63/08; C08B 37/00
[52] U.S. Cl. ..................... 525/54.24; 525/411; 525/450
[58] Field of Search ..................... 524/47, 30, 58, 524/81, 107, 366, 394, 400, 539, 396; 525/54.24, 411, 450

[56] References Cited

U.S. PATENT DOCUMENTS

| 4,076,846 | 2/1978 | Nakatsuka et al. | 426/62 |
| 5,360,473 | 11/1994 | Fleche et al. | 106/210 |
| 5,407,979 | 4/1995 | Wu et al. | 524/47 |

FOREIGN PATENT DOCUMENTS

| 0304401 | 2/1989 | European Pat. Off. . |
| 0396289 | 11/1990 | European Pat. Off. . |
| 0497706 | 8/1992 | European Pat. Off. . |
| 0530987 | 3/1993 | European Pat. Off. . |
| 0533314 | 3/1993 | European Pat. Off. . |
| 9010019 | 9/1990 | WIPO . |
| 9219680 | 11/1992 | WIPO . |

OTHER PUBLICATIONS

Patent Abstracts of Japan, JP 4146953, May 20, 1992, "Method for Controlling Biodegradability of Plastics", Yutaka et al.
"Polymer Finds New Use As Biodegradable Additive," Plastics Technology, p. 41 (May 1990), Bill Evans.
Jetro, p. 38 (Aug. 1991), "New Biodestructable Plastic Foam".
"Chuo Kagaku, Fermentation Research Institute Develop New Biodegradable Plastic," Comline Chemicals & Materials, p. 2 (Mar. 28, 1990).
Derwent Abstract No. 92-222620, JP-A-4146953, May 20, 1992, "Control of Biodegradation of Plastics Garbage Bags".
Derwent Abstract No. 247298, JP-A-4168150, Jun. 16, 1992, "Biodegradable Plastics for Combustible".
The Chemistry of Cellulose and Wood, Nikitin Israel Progragram for Scientific Translations, Jerusalem, 1966.

Primary Examiner—Jeffrey C. Mullis
Attorney, Agent, or Firm—Jacobson, Price, Holman & Stern, PLLC

[57] ABSTRACT

Disclosed is a thermoformable composition characterized in that it contains at least one starchy compound, at least one biodegradable polyester and at least one salt of hydroxycarboxylic acid.

45 Claims, 3 Drawing Sheets

BIODEGRADABLE MOULDING COMPOSITIONS COMPRISING A STARCH, A BIODEGRADABLE POLYESTER, AND A SALT OF A HYDROXYCARBOXYLIC ACID

The present invention relates to a new biode-composable or biodisintegrable thermoformable composition. It also relates to a new process for the preparation of said thermoformable composition and to the use of this composition with a view to obtaining thermoformed articles.

The preparation of articles of determined shapes and in particular thermoforming techniques, that is to say those for producing shapes by the action of temperature, rely to a large extent on synthetic materials such as polyethylene, polypropylene, polystyrene or polyvinyl chloride. To give examples, these synthetic materials are employed for the preparation of articles of all shapes (sheets, tubes, rods or more elaborate shapes) and destinations, such as packaging (trash can bags or containers), crop mulches, bottles, certain consumer articles (glasses, bedsheets) and the lake.

However, these synthetic materials are beginning to raise serious environmental problems, given their slow disappearance into the various ecological systems, where their degradation frequently takes place only after several tens of years.

Operations which make use of recycling and incineration make it possible already today to limit the detrimental effects of the waste consisting of synthetic plastics. The development and the optimization of these operations will result in a marked lowering in pollution. Similarly, solutions have been proposed for accelerating the degradation of synthetic polymers by photooxidation. Additives based on unsaturated fatty acids in combination with heavy metals, for example, produce the degradation of the synthetic macromolecule by a radical mechanism under the action of light. The short chains thus obtained promote the dispersion of the material and its elimination into the natural environment. However, photometabolites and heavy metals can occasionally present pollution problems.

Other solutions are based on the principle of the biodegradation of biodegradable components introduced into a polymer for the purpose of forming what has conventionally come to be called a degradable plastic. Thus, a number of methods will characterize this process which, to a large extent, relies on starch as biodegradable component. This polymer has the advantage of being a source of annually renewable raw material which is biodegradable under the action of the enzymes secreted by microorganisms such as bacteria or mildews. Overall, these methods can be divided into three groups, depending on the technique of application of the starch.

A first technology, described, for example, in Patent FR 2,252,385, consists in introducing into a polyolefinic substance, consisting especially of polyethylene, granules of starch in a proportion which is generally between 5 and 30%, more particularly of the order of 15%. The starch here acts as a filler which is uniformly dispersed in the polyethylene substance. No interaction takes place between the highly hydrophilic starch and the highly hydrophobic polymer. The starch is added either directly into the polyethylene or, more commonly, by means of a master batch which may contain up to 50% of starch. The starch is generally dehydrated (moisture content lower than 1%) and an alternative form of the process, described in Patent GB 1,487,050, envisages precoating of the granule with hydrophobic silyl groups in order to increase the starch-polyethylene compatibility. A photodegradation-inducing system is sometimes added to the starch, making it then possible to combine bio- and photodegradation.

The starch contributes particular functional properties such as antiblocking, better printability, antistatic behaviour, etc. in molded or film articles, but with a reduction in the mechanical properties in the case of films.

A second technology described, for example, in Patents EP 32,802 and EP 132,299, consists, with a view to obtaining flexible films, in introducing a continuous starch phase into a synthetic polymer in order to form a structure which could be described as a composite. The starch granule disintegrated by gelling or extrusion is, as described in Patent EP 32,802, dispersed in a synthetic polymer of hydrophilic nature such as a partially neutralized ethylene-acrylic acid copolymer (EAA), optionally in the presence of a plasticizer Such as glycerol or ethylene glycol. This technique permits an introduction of 50 to 60% of starch. The starch-synthetic polymer composite thus obtained is presented as making it possible to manufacture extruded films whose mechanical strength is improved and exhibiting better biodegradability. In this system the starch is galled in the presence of water and the moisture content of the mixture must be lowered to the 2–10% range before the molding or extrusion operations.

Bearing in mind the maximum quantities of water thus required, it is described as being generally necessary to perform at least two runs of the compositions on an extruder, and this makes this technology complicated and costly in energy and apparently difficult to extrapolate to a continuous production of articles containing high proportions of starch.

In addition, according to the indications of the above-mentioned Patent EP 32,802, the presence of 30 to 40% by weight of starch within the composite makes it necessary to use polyethylene (10 to 40%) with a view to reinforcing the mechanical properties of the films obtained.

The two technologies described above generally make use of mixtures of starch and of synthetic resins.

The third technology, described in particular in Patents EP 118,240 and EP 326,517, for its part is aimed at obtaining thermoformable material based essentially on starch. To reach this objective, the starch must be in the form of granules which are destructured by fusion. Its application can then be carried out on conventional equipment for converting plastics. During this treatment a plasticizing system has generally to be added to the starch.

Combined use of a destructured starch with water-insoluble synthetic thermoplastic polymers has also been described, for example in Patent EP 327,505.

Nevertheless, the manufacture of a thermoformable material with a high starch content, as described in Patent EP 118,240, demands rather high temperature and pressure ranges (temperature higher than 120° C. and pressure of several hundred bars) in order to satisfy the conversion conditions in an injection molding machine.

With a view to improving the conditions of application of the starchy material it has been recommended, as described in Patent EP 282,451, to destructure the starch at elevated temperature (preferably 160 to 185° C.) in the presence of a catalyst of starch depolymerization, the said catalyst, for example hydrochloric acid, needing to make it possible to reduce the average molecular mass of the starch by a factor of 2 to 5,000.

The articles, particularly capsules, obtained after molding and cooling are by nature biodegradable but, on the other hand, are rigid, very brittle and hygroscopic, and their mechanical properties vary with their water content.

To lower this sensitivity to water or to modify the final properties of the starchy material, it has furthermore often been proposed to use it in combination with one or more additives chosen, in particular, from:
- hydrophilic agents and, for example, gelatin, proteins, water-soluble polysaccharides,
- inorganic filling agents and, for example, magnesium, aluminum or titanium oxide,
- plasticizing agents and, for example, polyethylene glycol.

However, none of the above arrangements makes it possible to obtain a thermoformed article from one of the starchy systems proposed by the prior art which meets all the technology requirements, namely especially a thermoplastic behavior, water resistance and a total biodegradability.

The palliatives proposed by the prior art have consisted in introducing, in proportions lower than 20% by weight of the starchy material, a synthetic thermoplastic polymer in order to improve the problems of water resistance, but have been accompanied by a loss in the biodegradable nature of said articles. Thus, in order to improve the water resistance of said products together with their biodegradability, it has also been proposed to employ polyesters such as lactic acid polymers as described in U.S. Pat. No. 2,703,316 or to use hydroxy acid polymers such as EVA or ethylene-maleic anhydride copolymers, for example as described in Patents WO 92/04,410 and WO 92/04,412. The articles thus obtained nevertheless remain 100% nonbiodegradable.

Patent WO 91/06,601 claims the use of certain polyesters such as polylactic acid and polycaprolactone as degradation accelerators.

Patent EP 282,368 mentions the manufacture, by calendering at temperatures of 120°–160° C., of films based on polyurethane, preferably used in combination with an aliphatic polyester such as polycaprolactone (PCL), with a carbohydrate, such as potato tuber starch and with PVC, this being in the presence of a monomeric or polymeric plasticizer for PVC, especially dioctyl phthalate (DOP).

It is said that the aliphatic polyester makes it possible, inter alia, to facilitate processing and to increase the biodegradability of the products (films) obtained, with regard to articles according to the prior art, using polyurethane and starch in combination. Thus, according to the teaching of this patent, the compositions used comprise relatively low proportions of carbohydrate (10 to 45% relative to the overall mixture) and no provision is made for the incorporation, within said compositions, of a particular agent capable of plasticizing the carbohydrate, in particular starch.

Patent EP 444,880 describes the combined use, at high temperature, of a biodecomposable resin such as polycaprolactone or polyhydroxybutyrate (PHB) and of a natural substance of high molecular weight, such as, for example, a corn starch, this being optionally in the presence of a nonbiodecomposable resin such as polyethylene. This combined use is made in the absence of any agent capable of plasticizing said natural substance, the latter not being taken as a thermoplastic substance but rather as a filler representing at most 70% of the compositions described. Molded articles originating from such compositions, which can be referred to as composite materials, can only be capable of being bioembrittled and are not completely biodegradable. In addition, it appears that articles containing at least 25% by weight of natural substance are hygroscopic and, in order not to undergo a deterioration of their mechanical properties, require the surface application of a film of hydrophobic nature.

Japanese Patent JP 4,146,953 envisages the use of a filler of both inorganic and organic nature with a view to preventing the premature biodegradation of articles based on aliphatic polyesters.

Starches and copolymers of starch and of vinyl acetate are, inter alia, mentioned as organic fillers which make it possible to retard and to control the biodegradability of polyesters such as especially polycaprolactone (PCL) and polyhydroxybutyrates (PHB). No reference is made to particular agents capable of plasticizing the starches.

Japanese Patent JP 4,168,150 aims at obtaining, by a casting/evaporation technique, plastic films based on hydrolyzable polymers, and especially on polymers of hydroxyacids such as lactic, maleic and glycolic acids, exhibiting good mechanical properties and which are biodegradable after use. With a view to increasing this biodegradability, the hydrolyzable polymer, dissolved in a particular solvent, is used in combination with a culture medium capable of permitting the growth of the microorganisms which degrade said polymer. Such a culture medium, incorporated in low proportions (0.01 to 10%/weight of polymer) may consist especially of a combination between yeast extract, peptone, glucose and starch, the latter in this case being considered as a source of carbon and not at all as a potentially thermoplastic substance.

Patent WO 92/19680 describes the preparation, by extrusion or blow-molding, at high temperatures, of a molten mass combining a starch and glycerin as plasticizing agent, generally in the presence of ethylene/vinyl acetate (EVA) copolymer, of polycaprolactone (PCL) or a polycaprolactone-based copolymer. The articles obtained are presented as having good biodegradability, good mechanical and/or water resistance properties and low permeability to water vapor. However, the process for obtaining the final molten mass is relatively complex, generally envisaging the introduction of PCL only after a first extrusion stage, (with the need to degas) and the preparation of intermediate pellets based on the starchy compound.

Patent EP 530,987 describes the preparation, by extrusion at high temperatures (in practice 190° C.) of biodegradable compositions combining particular homopolymers or copolymers based on lactic acid, namely those having a molecular weight of 50,000 to 1,000,000 and corn starch, preferably in the presence of ethyl oleate to improve the polylactate/starch compatibility.

It appears that the attempts made hitherto no exploit compositions combining a biodegradable polyester and a starchy compound have, in general:
- either employed said starchy compound merely as filling agent or as source of carbon and not as a potentially thermoplastic substance, the articles resulting from said compositions being in most cases composite materials, only capable of being bioembrittled and not entirely biodegradable,
- or called for complex and/or necessarily energy-costly means with a view to truly exploiting the thermoplastic nature of said starchy compound.

In addition, the water sensitivity and/or the poor mechanical characteristics inherent in the starchy compounds, and the often poor compatibility between starchy compounds and polyesters have not so far made it possible to apply such compositions no the industrial manufacture of a wide range of thermoformed articles.

Thus, from the above it follows that there was a need to find a simple and inexpensive—especially in terms of energy—means for obtaining a thermoformable material which should be biodegradable and which should be applicable to the manufacture of a wide range of thermoformed articles and which should not give rise to any real problems of not resisting water.

Surprisingly and unexpectedly, such a means could be constituted by the combined use, optionally in the presence of other constituents, of at least one starchy compound of at least one biodegradable polyester and of at least one salt of hydroxycarboxylic acid, processed at a temperature preferably lower than 150° C.

Figure 1:
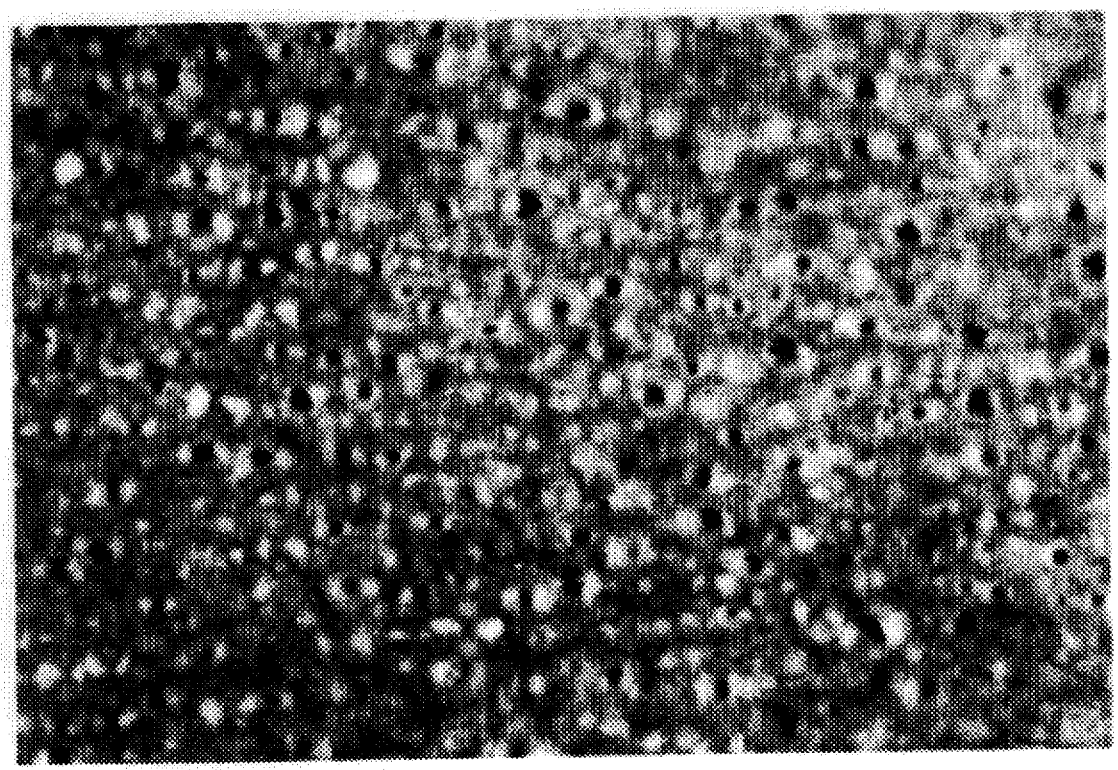
FIG. 1 shows a micrograph of a thermoformed article according to the present invention magnified 222×.

More precisely, the subject of the present invention is a biodecomposable or biodisintegrable thermoformable composition characterised in that contains:

at least one starchy compound,
at least one biodegradable polyester, and
at least one said of hydroxycarboxylic acid.

A particularly advantageous first aspect of the invention lies in the fact that the starchy compound contained within said thermoformable composition can be processed under temperature and/or pressure conditions which are significantly less severe than those generally required in industrial practice and therefore more favorable to maintaining its intrinsic properties.

As a result whereof, the starchy compound contained within the thermoformable composition which is the subject of the invention may advantageously, as stated above, be in a state which can be described as "partially molten".

This partially molten state differs from gelling of the starch and its complete melting or destructuring. Gelling of starch, which is obtained by virtue of the use of a high proportion of water, results in colloidal dispersions being obtained. On the other hand, complete melting or destructuring of starch is obtained essentially by heat treatment and results in the complete disappearance of the starch particles as, for example, observed by microscopic examination of thermoformed articles based on Novon® composition, which is marketed by the Warner-Lambert Company (of. FIG. 3, appended). The partially molten state corresponds to an intermediate state in which an at least partial destruction of the inter-molecular hydrogen bonds is observed with the establishment of new hydrogen bonds between water and the hydroxyl groups of the starch. In this intermediate state a certain proportion of starch granules is seen to continue to exist, as illustrated by the appended FIG. 1 and 2.

A particularly advantageous second aspect of the invention lies in the very great versatility of the thermoformable compositions in accordance with the invention which make it possible to obtain formed articles exhibiting a very wide range of mechanical properties, especially in terms of viscoelasticity, including those in the case of a thermoforming device and of given operating parameters.

The Applicants have furthermore found that an effective and original means of assessing said mechanical properties could consist of the use of the so-called Dynamic Mechanical Analysis technique, which will be detailed below in relation to the examples.

At this point of the specification it is appropriate merely to emphasize that the Dynamic Mechanical Analysis technique makes it possible to determine the variation in the loss factor tan δ of a given material over a range of temperatures and in particular to know the temperature at which said material, which is tested in the form of a sample of given dimensions, exhibits a maximum loss factor tan δ. The temperature thus determined makes it possible to come close to the glass transition temperature of said material.

It is remarkable to emphasize that the compositions in accordance with the invention make it possible to obtain thermoformed articles exhibiting a maximum loss factor tan δ situated in a very wide range of temperatures, especially between 0° and 160° C., that is to say in the range including the glass transition temperatures of the majority of traditional synthetic polymers.

The thermmoformable composition which is the subject of the invention, which contains at least one starchy compound, preferably partially molten, at least one biodegradable polyester and at least one salt of hydroxycarboxylic acid, is advantageously additionally characterized by the fact than it is capable of yielding a thermoformed article exhibiting a loss factor tan δ whose maximum value lies at a temperature not exceeding 150° C., especially approximately between 0° and 130° C.

The term starchy compound, within the meaning of the present invention, is intended to mean any type of starch, whatever its source, natural or modified by a chemical and/or physical route. When a natural starch is called upon to constitute compositions in accordance with the invention, it is chosen especially from the group including ordinary or hybrid natural starches originating from corn, from corn with a high content of amylopectin (waxy starch), from corn with a high content of amylose, from wheat, rice, peas, potatoes, manioc, the cuts or fractions thereof which can be made or obtained and any mixtures of at least any two of the abovementioned products.

The foregoing thermoplastic starches can be destructured, pregelled or modified after addition of water and/or of plasticisers as described in the abovementioned Patent Application WO-90-10,019. By way of plasticisers there may be mentioned, no limitation being implied, glycerine, diglycerine, polyglycerines, sorbitol and mixtures thereof. The thermoplastic starch used in the present invention may contain up to 50% by weight, and preferably from 5 to 40% by weight, of plasticisers.

The starch used may be advantageously a maize starch rich in amylose, such as the starch marketed by Roquette Frères under the trademark Eurylon 7®, a maize starch rich in amylopectin such as the starch Waxilys® marketed by the same company, a wheat starch such as the starch Nutrlys®, also marketed by the same company, a potato starch, and the like, or else a mixture of such starches. In general, the Applicant Company prefers to use starches whose amylopectin content is at least 70% because they generally result in particularly homogeneous products.

When a chemically modified starch is called upon to constitute compositions in accordance with the invention, it is chosen especially from the group comprising starches modified by at least one or other of the known techniques of etherification, esterification, crosslinking, oxidation, alkaline treatment and acidic and/or enzymatic hydrolysis.

To give an example, it is possible advantageously to call upon starches etherified by means of ionic, in particular cationic or nonionic, groups, it being possible for the latter to consist of hydroxyalkylated starches such as hydroxypropylated or hydroxyethylated starches.

The terms "biodegradable polyester" within the meaning of the present invention are intended particularly to mean a product chosen from the list comprising:

polylactic acid (PL),
polyglycolic acid (PG),
polyhydroxybutyric acid (PHB), polyhydroxypropionic acid (PHP), polyhydroxyvaleric acid (PHV), copolymers of at least two of the abovementioned products, derivatives and salts of all of them such as salts of polylactic acid or polylactates like, for example, sodium polylactates.

Products obtained by copolymerisation of lactide units and of glycolide units and/or delta-valerolactone can also be called upon.

Such polyesters are described especially in Patent Application WO 90/01,521, in particular from line 13, page 4, to line 18, page 10, this passage being incorporated into the present description.

The terms "polylactic acid" are intended, inter alia, and without this definition being in the least limiting, to mean all the polymers and oligomers based on D and/or L lactic acid exhibiting a molecular weight lower than 1,000,000, especially lower than 150,000 and in particular the oligomers of D and/or L lactic acid exhibiting a molecular weight of approximately 500 to approximately 5000.

The term of aliphatic thermoplastic polyester is intended to denote any biodegradable aliphatic thermoplastic polyester.

As thermoplastic aliphatic polyester, the

Applicants prefer to use aliphatic polyesters and copolyesters in which the ester functional groups are separated by linear or branched hydrocarbon groups containing at least 3 carbon atoms.

By way of such polyesters and copolyesters there may be mentioned especially those derived from hydroxyalkanoates and, in particular, from 3-hydroxybutyrate, 3-hydroxyvalerate and 3-hydroxypropionate, such as those disclosed in European Patent Application EP-A-396,289 of Imperial Chem. Inds. PLC., published on 7 Nov. 1990.

A class of biodegradable thermoplastic polyesters which is particularly suitable within the scope of the present invention consists of homo- and copolymers of lactones such as, for example, ε-caprolactone or δ-valerolactone. The copolymers may contain comonomer units of various types. In general they are copolymers of different lactones or of a lactone with an olefin oxide such as ethylene or propylene oxide or else with a mixture of a glycol such as ethylene glycol and of a dicarboxylic, preferably acyclic, acid such as adipic acid. The lactone copolymers may contain variable quantities of monomer units derived form lactones.

The Applicants prefer to use lactone homopolymers and in particular those produced from ε-caprolactone.

Within the scope of the present invention a "hydroxycarboxylic acid" is intended to mean any acid containing at least one hydroxyl functional group and at least one carboxylic functional group.

This definition applies especially to acids of the following type:

monohydroxy/monocarboxylic, such as lactic, glycolic or hydroxybutyric acids, monohydroxy/polycarboxylic, such as citric, isocitric, malic or tartronic acids, polyhydroxy/monocarboxylic, such as gluconic, maltobionic, lactobionic, glucuronic, glyceric, ribonic, xylonic, galactonic or mevalonic acids, polyhydroxy/polycarboxylic, such as tartaric, mesoxalic or glucaric acids, any mixtures of at least any two of said acids, such as, for example, oxidised starch hydrolysates which, inter alia and in variable proportions, may contain gluconic acid and maltobionic acids, and especially oxidized glucose syrups (OGS).

The salt of hydroxycarboxylic acid which is called upon in the composition which is the subject of the invention can in particular be chosen from the group including salts of monohydroxy/monocarboxylic acids and salts of polyhydroxy/monocarboxylic acids, especially the salts of lactic acid, gluconic acid, maltobionic acid, lactobionic acid or glyceric acid, as well as any mixtures of at least any two of said salts. Also included are salts of glycolic, citric, isocitric, malic, tartronic, glucuronic, ribonic, xylonic, galactonic, mesovalonic, tartaric, mesoxalic and glucaric acids and mixtures thereof.

The salts employed are preferably those combining the hydroxycarboxylic acid with an alkali or alkaline-earth metal, in particular with a metal chosen from the group including sodium, potassium, calcium and magnesium. In order to improve the aging aptitude and/or also the water resistance of thermoformed articles obtained from the compositions according to the invention, the latter may especially contain a potassium salt of a hydroxcarboxylic acid.

Quite advantageously, the composition in accordance with the invention contains, as salt of hydroxycarboxylic acid, at least one salt of lactic acid, in particular an alkali or alkaline-earth metal salt of lactic acid and especially sodium lactate or potassium lactate.

It should be noted that the salt of hydroxy-carboxylic acid can—although this is not preferred—be generated in situ, that is to say by bringing together within the composition in accordance with the invention a hydroxycarboxylic acid, such as lactic acid, and an appropriate base (sodium hydroxide, potassium hydroxide, lime, amine), care being taken to avoid, contrary to the teachings of abovementioned Patent EP-A-0,282,451, any acidic catalysis capable of substantially depolymerizing the starchy compound.

With regard to the weight ratio of starchy compound(s) to biodegradable polyester(s) within the composition according to the invention, this ratio will generally be between 99/1 and 1/99. Within this wide range a person skilled in the art will be generally capable of finding, using routine tests, starchy compound(s)/biodegradable polyester(s) ratios which are those best suited for the application of a thermoforming operation, for example extrusion, which is truly applicable industrially.

Thus, in practice, when the composition in accordance with the invention is based on polyester(s) and especially on polymer(s) of lactic acid or of their salts, exhibiting a molecular weight equal to or greater than approximately 150,000, said composition exhibits a weight ratio of, on the one hand, starchy compound(s) to, on the other hand, biodegradable polyester(s) which is preferably between 90/10 and 10/90 and still more preferably 80/20 and 50/50, it being specified that account is taken of the dry weights introduced.

Similarly, in practice, when the composition in accordance with the invention is based on polyester(s) and especially on polymer(s) or oligomer(s) of lactic acid or of their salts, exhibiting a molecular weight smaller than approximately 150,000, said composition exhibits a weight ratio of, on the one hand, starchy compound(s) to, on the other hand, biodegradable polyester(s) which is preferably between 99/1 and 70/30.

In the particular case where the composition according to the invention is based on polymer(s) or oligomer(s) of lactic acid, or of their salts, exhibiting a molecular weight smaller than approximately 50,000 situated especially between approximately 500 and approximately 5000 and in particular between 800 and 3000, said composition additionally exhibits a weight ratio of, on the one hand, starchy compound(s) to, on the other hand, biodegradable polyester(s) generally situated still more preferably between 98/2 and 80/20.

Still according to a preferred embodiment of the invention, natural or modified starches with a high content of amylose will, for example, advantageously be called upon, especially when the compositions in accordance with the invention call upon reduced quantities of plasticizing agents or else small quantities of biodegradable polyesters, in the particular case where it is desired to retain a strong biodegradability of said compositions, the latter having, in any event, an improved water resistance as a result of the presence of said polyesters. On the other hand, the invention will advantageously call upon starches with a high content of amylopectin in other cases.

The composition in accordance with the invention preferably has a weight ratio of, on the one hand, the sum of starchy compound(s)+biodegradable polyester(s) to, on the other hand, the salt(s) of hydroxcarboxylic acid of between approximately 99/1 and 25/75 and more preferably between 98/2 and 40/60, it being specified that account is taken of the dry weights introduced.

In another preferred embodiment, the invention relates, in particular to biodegradable moulding compositions which are characterised in than they comprise from 5 to 60% by weight of at least one thermoplastic starch, from 30 to 94% by weight of at least one thermoplastic aliphatic polyester and from 1 to 10% by weight of at least one salt of a hydroxycarboxylic acid.

More particularly, the compositions in accordance with the invention preferably comprise at least 10% and, preferably, not more than 50% by weight of at least one thermoplastic starch, at least 42% and, preferably, not more than 88% by weight of at least one thermoplastic aliphatic polyester and at least 2% and, preferably, not more than 8% by weight of at least one salt of a hydroxycarboxylic acid.

Besides the characteristic presence of at least one starchy compound, of at least one biodegradable polyester and of at least one salt of hydroxycarboxylic acid, the composition according to the invention may contain one or more adjuvants of any kind and for any purpose (extenders or fillers, plasticizers, lubricants, colorants or the like), it being understood that the presence of said adjuvants must not significantly impair the biodecomposable or biodisinnegrable nature of said composition. As a general rule, said adjuvants, when present, represent overall, approximately 0.5% by weight up to approximately 30% by weight of the composition.

The latter may especially contain, without any limits being implied by this list:

one or more adjuvants chosen from the group including urea and its derivatives, hydrogenated sugars such as sorbitol, mannitol, maltitol, lactitol and products which may contain them, such as hydrogenated starch hydrolysates, glycols, polyethylene and polypropylene glycols, glycerol and its derivatives, anionic surfactants and any mixtures of at least any two of said adjuvants, one or a number of inorganic fillers such as titanium, silicon or aluminum oxides, talc, calcium carbonate and mixtures thereof, one or a number of water-repelling agents such as those of organosilicon nature and, for example, alkali or alkaline-earth metal siliconates, silicone oils, silicone resins and mixtures thereof, one or a number of coloring or flame-retardant agents, lubricants or antioxidants.

The water content of the composition forming the subject of the invention is not a predominant factor with a view to its application to the provision of thermoformed articles. In particular, there is no need whatever to adjust this water content, especially to relatively low contents and/or to degas as described in some abovementioned publications of the prior art.

It will merely be made certain that said composition has a moisture content such that its feeding can be suitably ensured where subsequent conversion equipment is concerned.

In practice this moisture content does not exceed approximately 40% and is situated especially between approximately 5 and approximately 30%.

It should be stressed that, within the scope of the invention, the introduction and bringing into mutual contact of the starchy compound, of the biodegradable polyester, of the salt of hydroxycarboxylic acid and of the optional adjuvants can be performed according to a multitude of alternative methods, especially with regard to the form of introduction (liquid, viscous or solid form, introduction by intimate mixing or by spraying, and the like) and the time of introduction (introduction at the beginning or fractionally with time) of each of these constituents within the composition.

As a result whereof, there is now available a new process for the preparation of a biodecomposable or biodisintegrable thermoformable composition, characterized in that a starchy compound is subjected, in the presence or absence of a biodegradable polyester and/or of a salt of hydroxycarboxylic acid and/or of one or more adjuvants of any kind, to a treatment capable of bringing it into a destructured or partially molten state, preferably partially molten, and in that, optionally, the starchy compound thus obtained is subsequently brought into contact with at least one biodegradable polyester and/or a salt of hydroxycarboxylic acid and/or one or more adjuvants of any kind, unless they have already been introduced.

The treatment to which the starchy compound is subjected, preferably to bring this latter into a partially molten state, may be performed in conventional devices of any kind, in particular those conventionally employed for the application of microwaves or ultrasonics to products of any kind and/or employed for the continuous or noncontinuous conversion of plastic and elastomeric materials and especially devices like single-screw or twin-screw extruders, blenders or injection presses.

According to the process in accordance with invention the treatment to which the starchy compound is subjected may be, for example, either a heat treatment optionally combining the action of ultrasonics and/or of pressure with that of temperature, in particular a treatment of baking-extrusion or of gelling on a drum, or a microwave treatment.

By way of example, devices of modular construction may be mentioned, such as the type MDK/E 46 or MDK/E 709 co-kneaders marketed by the Buss company.

The heat treatment, in particular baking-extrusion, to which the starchy compound may be subjected is preferably performed at a temperature not exceeding approximately 130° C., and situated especially approximately between 50° and 120° C.

According to a first alternative form of the process for the preparation of thermoformable composition in accordance with the invention, the treatment to which the starchy compound is subjected with a view to bringing it into a destructured or partially molten state, preferably partially molten, is performed in the presence, respectively, either of at least one biodegradable polyester or of at least one salt of hydroxycarboxylic acid, the starchy compound obtained being subsequently brought into contact, by any appropriate means, respectively either with at least one salt of hydroxycarboxylic acid or at least one biodegradable polyester.

According to another alternative form of said process the treatment to which the starchy compound is subjected with a view to bringing it into a destructured or a partially molten state, preferably partially molten, takes place in the presence of at least one biodegradable polyester and of at least one salt of hydroxycarboxylic acid.

As a result thereof the biodecomposable or biodisintegrable thermoformable starchy compositions obtained in accordance with the invention, which constitute novel industrial products, can be applied to the preparation of articles of any shape (reeds, tubes, films, granulates, capsules or more elaborate forms) and of any destination, this being done by making use of any available technique of thermoforming and especially by extrusion, coextrusion, injection molding, blow molding or calendering, e.g.,in the field of packaging and disposable articles.

The very great versatility of said thermoformable compositions is reflected, inter alia, in the possibility of obtaining, including in the case of a given thermoforming device and given operating parameters, formed articles exhibiting—besides a great biodegradability and good water resistance—a very wide range of mechanical properties, especially in terms of viscoelasticity.

The invention will be capable of being better understood with the aid of the examples which follow and which take account of certain particularly advantageous embodiments of the thermoformable compositions according to the invention.

EXAMPLES

Example 1

PREPARATION, APPLICATION AND CHARACTERIZATION OF COMPOSITIONS ACCORDING TO THE INVENTION CONTAINING A POLYLACTATE OF HIGH MOLECULAR WEIGHT (MW≈150,000)

1. EXAMPLE OF EMBODIMENT OF COMPOSITIONS ACCORDING TO THE INVENTION

The bringing into contact, in accordance with the invention, of at least one starchy compound, a polyester such as, for example, a lactic acid polymer or a copolymer originating from lactic acid and at least one salt of hydroxycarboxylic acid and optional adjuvants, takes place, at ambient temperature, in a homogenizer of Pappenmeier type cooled by circulating water.

It will be noted that in this more particular use of lactic acid polymer or copolymers it is optionally possible to call upon the prepolymerizing materials capable of fulfilling the function of the polymer and/or copolymer and that of the salt of hydroxycarboxylic acid at the same time.

In the case of the use of a salt of hydroxycarboxylic acid which is in a liquid form (for example sodium lactate), said salt is added progressively to the mixture, which is homogenized for a period of the order of several minutes.

2. APPLICATION OF THE COMPOSITIONS TO THE PREPARATION OF THERMOFORMED ARTICLES

A composition obtained as described above and based on sodium polylactate of high molecular weight (≈150,000) is introduced, for example at ambient temperature, into the feed hopper of a conversion machine of Buss PR 46 co-kneader type.

This apparatus, which makes it possible to obtain a thermoformable composition and then to form it, consists of a mixer followed by a finishing extruder with a crosshead and a die equipped with a cutter, which makes it possible to prepare granules from the thermoformed article obtained, the latter being in the form of a reed. The general processing conditions are as follows:

The target temperature is 120° C. and, because of the water-cooling of the feed zone, a gradient is established, ranging from 100 (region in the vicinity of the feed zone) to approximately 115° C. (die region).

The speed of rotation of the screw is adjusted so as to obtain the best mixing possible; it is situated approximately between 20 and 60 rev/min.

The pressure is maintained at a value below approximately 5 bars.

The thermoformed articles obtained in the present case (reeds, granules) can be employed as such. However, in general, they will be more apt to be intended for feeding other, continuous or noncontinuous, conversion devices such as injection presses, single- or twin-screw extruders or calender rolls, with a view to the manufacture of finished objects such as tubes, sections, films, sheets or injection moldings.

From Patent Application FR 91/01,120 we are aware that it is quite possible to obtain a wide range of thermoplastic materials originating from at least one starchy compound and at least one salt of hydroxycarboxylic acid, and that these exhibit mechanical characteristics which are both advantageous and diversified. The presence of the polyesters claimed will only slightly modify the operating conditions, especially the temperature which will be slightly higher. Very generally, the whole extent of the possibilities which are offered and linked with the source of the starch, its method and its degree of conversion will be kept for the plasticizing system employed as well as the conversion conditions.

The essential additional advantage of the implementation of the envisaged mixtures lies in the improvement of the water resistance and the adjustment of the capacity for biodegradation or biodecomposition, these properties being thus more compatible with the industry's requirements.

In fact, the essential reproach which can be made against compositions based on the exclusive use of starch for polymers is their water sensitivity, their difficulty in reducing the latter and their excessively fast biodegradability —this material being so vulnerable in a moist or aqueous environment.

The introduction of the polyesters claimed will make it possible to improve appreciably this behavior towards water while still permitting the biodegradability, the latter moreover appearing to be more suitable insofar as the action of microorganisms on the starchy part and hydrolysis of the polyester will intervene in parallel to embrittle the object discarded on a waste tip.

3. CHARACTERIZATION OF THE COMPOSITIONS a. Characterization by dynamic mechanical analysis of the mechanical properties of the articles obtained.

Dynamic Mechanical Analysis is a method which is particularly sensitive to any change in the structure and the macromolecular interactions giving rise to a modification in the macroscopic properties of the material. It is a very fine technique for determining the variation in elastic moduli and in the loss of a sample as a function of temperature. The same technique also provides access to the glass transition temperature (Tg) of the material. The knowledge of this value and the damping properties measured in the solid state can be employed to predict the temperature of utilization, the impact properties and the rigidity of the finished product.

The principle of Dynamic Mechanical Analysis is based on the application to a sample of a sinusoidal linear (or torsional) deformation of a given frequency and of low amplitude, superposed on a constant stress of known value. The response of the material is a stress of the same pulsation but out of phase by an angle. The behavior of the material is described by a complex quantity called complex elasticity modulus such that:

$$E = E' + E''$$

where

E' is the elastic modulus and E" the viscosity modulus. The phase shift angle is such that tan δ, also called the loss fact or, is equal to E"/E'.

A purely elastic material such as steel will exhibit a zero phase shift angle, that is a nil imaginary component. A purely viscous material such as water will exhibit a zero real component. The phase shift angle will then be 90°. In the case of synthetic polymers, a viscoelastic material will be capable of covering all values between 0° and 90°.

A particular improvement has been made to the technique by the manufacture of a measurement cell of special geometry making it possible to isolate the material from air by employing a silicone oil of very low viscosity; this limits the problems relating to the water present in the sample.

In the present case the tests were conducted on an apparatus of R.S.A. (Rheometrics Solid Analyser) II type. The geometry of measurement is cylindrical tension/compression and temperature scanning is performed at constant stressing frequency. In our case the frequency chosen is ω=10 rad/s and the temperature region covered ranges from room temperature to approximately 150° C. A measurement is carried out every 2° C., while the sample is allowed a period of 2.5 min in order to ensure its thermal equilibrium with the oven.

The materials tested originate from thermoformed reeds obtained as described above, which are perforated and cut into samples whose dimensions are as follows:

maximum diameter: 15 mm preferred diameter: 8 to 14 mm maximum thickness: 25 mm preferred thickness: 3 to 5 mm The determination of the loss factor tan δ made on articles obtained from two compositions according to the invention gives the following results:

| | | | Temperature (°C.) at the maximum of tan δ | |
|---|---|---|---|---|
| | | | Waxy corn starch (WAXILYS (a starch product) ®) | Amylose-rich corn starch (EURYLON (a starch product) 7 ®) |
| Starchy compound | 75% | 70% | | |
| Sodium polylactate | 25% | | | |
| Sorbitol | 10% | | approxi- mately 58° C. | approxi- mately 55° C. |
| Glycerine | 10% | | | |
| Sodium lactate (80% SC) | 10% | | | |
| (the percentages are expressed by weight) | | | | | b. WATER SENSITIVITY

Measurement is made of the time needed to attain the complete physical destruction in 100 ml of distilled water at 20° C. of a sample in the form of a cylinder 6 mm in diameter, of 5 g of thermoplastic composed in the case of 30 parts of plasticizer made up of:

10 parts of sorbitol powder, 10 parts of glycerin, 10 parts of sodium lactate with an SC of 80%, and in the case of 70 parts of:

| waxy corn starch | 4 hours |
|---|---|
| 75% of waxy corn starch + 25% of sodium polylactate | 24 hours |
| 50% of waxy corn starch + 50% of sodium polylactate | 15 days |
| 25% of waxy corn starch + 75% of sodium polylactate | 3 months |
| amylose-rich starch (70%) | 4 hours |
| 75% of amylose-rich starch + 25% of sodium polylactate | 96 hours |
| 50% of amylose-rich starch + 50% of sodium polylactate | 2 months |
| 25% of amylose-rich starch + 75% of sodium polylactate | 10 months |
| sodium polylactate alone (MW = 150,000) | 12 months | c. Biodegradability was measured by the biological oxygen demand method at five days (BOD5) of samples composed: in the case of 30 parts of plasticizer consisting of:

10 parts of sorbitol powder, 10 parts of glycerin, 10 parts of sodium lactate with an SC of 80%, and in the case of 70part of:

| waxy corn starch | 456 mg/g |
|---|---|
| amylose-rich starch | 205 mg/g |
| sodium polylactate | 110 mg/g |

Example 2

APPLICATION AND CHARACTERIZATION OF COMPOSITIONS ACCORDING TO THE INVENTION CONTAINING AN OLIGOLACTATE OF LOW MOLECULAR WEIGHT (MW≈2500)

1. APPLICATION OF THE COMPOSITIONS TO THE PREPARATION OF THERMOFORMED ARTICLES

The extrusion behavior of compositions according to the invention containing an oligolactate of low molecular weight (MW=2500), referred to below as "PLA 2500" is studied within the scope of this example.

The extrusion treatment is conducted on a RHEOMEX TW 100 twin conical screw extruder used in combination with a Rheocord 90 drive unit.

The barrel is conical and has a length of 300 mm.

The extruder is equipped with three heating zones along the barrel (zones 1, 2 and 3) and a head heating zone (zone 4) and mixed pressure and temperature sensors in zones 2, 3 and 4. The two screws (standard screw set reference 557-2211) are of interpenetrating and counter-rotating type.

The die employed has a diameter of 6 mm.

Depending on the composition, the target temperature lies between 90 and 110° C.

The change in the temperature T of the material, expressed in ° C., and the torque C, expressed in Nm, with which the extruded material opposes the rotation of the screws are recorded during the extrusion tests.

Table 1 below reproduces the material torque and temperature values recorded with different compositions according to the invention, as well as general remarks on the thermoformed articles obtained (reeds).

Two control compositions are tested within the scope of this example, namely, respectively:

composition T, based, in particular, on a starchy compound (in this case an amylose-rich starch marketed by the Applicant Company under the name "EURYLON® VII"), of a salt of hydroxycarboxylic acid (in this case sodium lactate of 60% solids content) but free from biodegradable polyester, composition 6, based, in particular, on starchy compound (EURYLON® VII) and biodegradable polyester (in this case the abovementioned polyester called "PLA2500"), but free from plasticizing agent of the salt of hydrozycarboxylic acid type.

between 800 and 3000, as is the case with the abovementioned product "PLA 2500", a person skilled in the art will generally arrange for said composition to have a weight ratio of starchy compound(s) to biodegradable polyester(s) preferably situated between 99/1 and 70/70 and still more advantageously between 98/2 and 80/20 in order that said composition should be easily extrudable at relatively low temperatures (<120° C.).

2. CHARACTERIZATION OF THE DEGREE OF BIODEGRADABILITY OF THE COMPOSITIONS

The biological oxygen demand (BOD5) and the chemical oxygen demand (COD) of each of the samples listed in Table

| COMPOSITION | T | 1 | 2 | 3 | 4 | 5 | 6 | 7 | 8 | 9 |
|---|---|---|---|---|---|---|---|---|---|---|
| Amylose-rich starch Eurylon VII | 70 | 70 | 70 | 70 | 70 | 70 | 70 | — | — | 70 |
| Amylopectin-rich (waxy) starch | — | — | — | — | — | — | — | 70 | 70 | — |
| Sorbitol | 20 | 20 | 20 | 20 | 20 | 20 | 20 | 20 | 20 | 20 |
| Sodium lactate | 10 | 10 | 10 | 10 | 10 | 10 | 0 | 10 | 10 | 6 |
| PLA 2500 | — | 40 | 10 | 10 | 5 | 2 | 6 | 2 | 6 | 2 |
| Water | — | — | — | — | — | — | 4 | — | — | 2 |
| Torque (Nm) | 65 | | 15–25 | 8–10 | 23–26 | 32–35 | | 20–15 | 15 | 45–50 |
| Material temperature T (°C.) | 109 | | 100–118 | 106–115 | 109–115 | 107–108 | | 102–103 | 103 | 105–107 |
| General remarks | homogeneous and smooth molten reed | No apparent conversion. Powdery product obtained | homogeneous and smooth molten reed | homogeneous and smooth molten reed | homogeneous and smooth molten reed | homogeneous and smooth molten reed | Extruder blocked | homogeneous and smooth molten reed | homogeneous and smooth molten reed | homogeneous and smooth molten reed |

Observations by microscope made on the thermoformed articles obtained from compositions such as compositions 2 to 5 and 7 to 9 show that the starchy compound present in said articles is in a partially molten state characterized by the persistence of starch granules which have not undergone destructuring melting.

These compositions are perfectly extrudable and make it possible to obtain homogeneous and smooth molten reeds, which is not the case with composition 6, which is free from any salt of hydroxycarboxylic acid and is found to be unconvertible.

It is remarkable, furthermore, to note that the compositions according to the invention make it possible to employ advantageously starchy compounds which are as different, from the viewpoint of their nature, composition and properties, as amylose-rich starches and amylopectin-rich starches.

In the present case, namely of the compositions according to the invention in which the biodegradable polyester is of oligolactate type of low molecular weight, it is also observed that a relatively high proportion of said polyester in relation to the starchy compound, for example in a starchy compound/polyester weight ratio of 70/40, as envisaged in composition 1, produces an unfavorable effect on the applicability of the resulting mixture, which is biodegradable, to the particular extrusion treatment as envisaged in the present example.

As a result whereof, as already stated, in the particular case where the composition according to the invention is based on one or more polymer(s) or oligomer(s) of lactic acid (or their salts) with a molecular weight lower than approximately 50.000, lying especially between approximately 500 and approximately 5000 and in particular 2 below where measured according to standards NF 90 103 and NF 90 101 respectively, with a view to calculating the degree of biodegradability B of each of said samples, this being expressed in percent and obtained by the formula $B = (BOD5/COD) \times 100$.

The test samples originate from compositions T, 3, 5, 7 and 9 described in Table 1 above. However, in the present case, the degree of biodegradability B of each of these compositions was generally evaluated respectively before the extrusion treatment as described above, that is to say when said compositions constitute only simple mixtures untreated thermally, and after said extrusion treatment, namely on the thermoformed articles obtained (reeds).

The results obtained are listed in Table 2 below.

| COMPOSITION | BOD5 g/g | COD g/g | Degree of biodegradability B in % |
|---|---|---|---|
| Composition T before extrusion | 0.325 | 0.875 | 37.1 |
| Composition 2 before extrusion | 0.360 | 1.04 | 34.6 |
| Composition 3 before extrusion | 0.330 | 0.925 | 35.6 |
| Composition 5 before extrusion | 0.305 | 1.03 | 29.6 |
| Composition 7 before extrusion | 0.559 | 1.14 | 49.0 |
| Composition 9 before extrusion | 0.390 | 1.16 | 33.6 |
| Composition T after extrusion | 0.470 | 1.00 | 47.0 |
| Composition 3 after extrusion | 0.305 | 1.15 | 26.5 |
| Composition 5 after extrusion | 0.385 | 1.03 | 37.4 |
| Composition 7 after extrusion | 0.445 | 1.02 | 43.6 |
| Composition 9 after extrusion | 0.340 | 0.96 | 35.4 |

With regard to the results obtained specifically on the compositions evaluated before extrusion, it is noted, in general, that the presence of the biodegradable polyester, in this case the oligolactate "PLA 2500", makes it possible to decrease, and therefore to control, the degree of biodegradability of compositions based on a specified starchy compound (for example amylose-rich starch) into which it is introduced. However, this decrease does not appear to be necessarily proportional to the degree of incorporation of said oligolactate. Furthermore, comparison of the results obtained in the present case:

- with compositions 5 and 7 before extrusion, shows that a starchy compound of amylopectin-rich starch type (waxy starch—of composition 7) imparts significantly more biodegradability to a composition into which it is introduced than an amylose-rich starchy compound ("EURYLON® VII"—of composition 5).
- With compositions 5 and 9 before extrusion or compositions 2 and 3 before extrusion, respectively, appears to show that the degree of introduction of the salt of hydroxycarboxylic acid, in this case sodium lactate, has no major influence on the degree of biodegradability of said compositions.

The results obtained specifically on the compositions obtained according to the invention after extrusion allow the same general conclusions as above to be drawn. It is remarkable, however, to note that, surprisingly:

- composition 5 and, to a lesser degree, composition 9 are, like the control composition T, less biodegradable before extrusion than after extrusion and,
- inversely, compositions 3 and 7 are less biodegradable after extrusion than before extrusion.

In the following examples the compositions are blended in a BRABENDER PLASTOGRAPH® laboratory internal mixer by following a heating cycle and blending periods repeated in the examples and, after blending, the rheological measurements are performed on a plaque 1 mm in thickness, obtained by hot pressing.

Examples 1R, 2R, 3R, 4R, 5R and 7R, which are given by way of comparison, are excluded from the scope of the present invention.

Example 1R

A mixture comprising 75% by weight of normal unplasticised maize starch and 25% by weight of a polycaprolactone of trademark CAPA 650®produced by the Solvay S. A. Brussels, Belgium is made up. 60 g of this mixture are introduced into a Brabender internal mixer and are blended at a kneader conditioning temperature of 150° C. for a period of 6 minutes at a cam rotation speed of 50 revolutions per minute. After blending, the molten mass is removed and pressed at 150° C. to obtain a plaque 1 mm in thickness. It is found that the plaque thus obtained is opaque, white and heterogeneous and that it has no tear resistance.

Example 2R

The procedure is as in Example 1R except that the mixture used contains 50% by weight of a normal maize starch, 25% by weight of glycerine and 25% by weight of polycaprolactone. The plaque obtained is translucent, grey in colour, homogeneous in appearance. It is found, furthermore, once again, that the tear resistance is defective.

Example 3R

The procedure is as in Example 2R, except that the starch used is a starch of trademark EURYLON ® produced by Roquette Frères, characterised by a high amylose content. It is found that the plaque obtained is yellow-brown in colour and heterogeneous in structure.

Example 4R

The procedure is as in Example 1R except that the mixture processed contains 16% by weight of a starch of trademark WAXILYS® produced by Roquette Frères, 9% by weight of polyglycerine and 75% by weight of polycaprolactone of trademark CAPA 650® produced by the Applicant Company and that the mixer is conditioned at 120° C. It is found that the plaque obtained is translucent, homogeneous in appearance but greasy in feel. It is also found that the plaque has a slightly improved tear resistance.

Example 5R

The procedure is as in Example 4R except that the mixture processed contains 32% by weight of starch (WAXILYS®), 18% by weight of polyglycerine and 50% by weight of polycaprolactone (CAPA 650®). The plaque obtained is very greasy in feel and has a tear resistance which leaves something to be desired.

It therefore appears that the plaques obtained according to comparative examples 1R to 5R and prepared from mixtures free from hydroxycarboxylic acid salt do not exhibit satisfactory properties.

Example 6

The procedure is as in Example 5R except that the mixture processed contains 15% by weight of starch (WAXILYS®), 7.5% by weight of polyglycerine, 2.5% by weight of sodium lactate and 75% by weight of polycaprolactone (CAPA 650®). This time it is found that the plaque obtained is homogeneous, dry in feel and resistant to tear.

Example 7R

The procedure is as in Example 6, except that the mixture processed contains 45% by weight of starch (WAILYS®), 23% by weight of polyglycerine, 7% by weight of sodium lactate and 25% by weight of polycaprolactone (CAPA 650®). The plaque obtained, which is produced from a mixture containing a proportion of polycaprolactone which is too low, is heterogeneous and does not resist tear.

Example 8

The procedure is as in Example 6, except that the mixture processed contains 30% of starch (Waxilys®), 15% by weight of polyglycerine, 5% by weight of sodium lactate and 50% by weight of polycaprolactone (CAPA 650®). The plaque obtained is homogeneous, translucent, dry in feel and resistant to tear.

Example 9

10-mm test pieces cut from the plaques obtained according to Examples 6 and 8 were tested at 70° C. by drawing at a constant pull rate gradient of 1 s$^{-1}$ by means of a RHEOMETRICS ELONGATIONAL RHEOMETER (RER), marketed by Rheometrics, and measurements were made of, on the one hand, the elongation at break and, on the other hand, the elongational viscosity at the end of deformation, that is to say just before the break.

The results thus obtained are repeated in Table 1 which follows.

TABLE 1

| Example | Elongation at break: mm | Viscosity Pa |
|---|---|---|
| 6 | 75 | 3.1 10$^4$ |
| 8 | 25 | 4.2 10$^5$ |

By way of comparison, the elongation at break of the polycaprolactone is 300 mm (in fact, the polycaprolactone is liquid at 70° C. and draws under its own weight) and its viscosity is 1.4 10$^4$ Pa.

It appears, therefore, that the compositions according to Examples 6 and 8 exhibit theological properties which permit processing by conventional routes.

10 μm thick section produced from a thermofold article obtained from composition 7 of Example 2 (FIG. 1)

Preliminary observation using Nikkon model Labophot microscope in polarized light.

FIG. 1 consists of a photograph (cameras Nikkon F-301 body, film sensitivity 100 ASA) taken through the microscope with polarized light. The magnification resulting from this photograph is 222×.

FIG. 1 clearly shows the significant persistence of granules of starchy compound, in this case of granules of amplopectin-rich (waxy) starch, and therefore the nondestructured but partially molten state of said starchy compound.

The diameter of these granules lies generally between 10 and 40 μm, especially between 30 and 40 μm.

Furthermore, these numerous persisting granules exhibit a polarization cross, confirming the general state of the starchy compound as being only partially molten.

Figure 2:
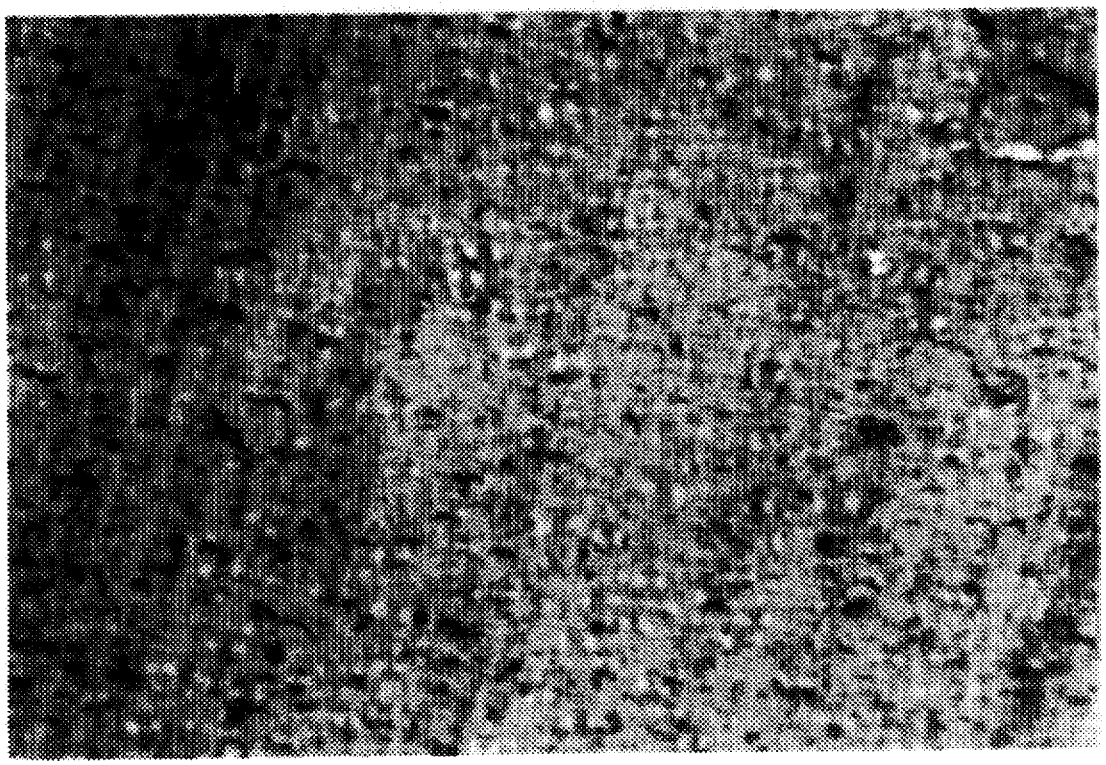
FIG. 2 shows a micrograph of a thermoformed article according to another embodiment of the present invention magnified 222×.
Figure 3:
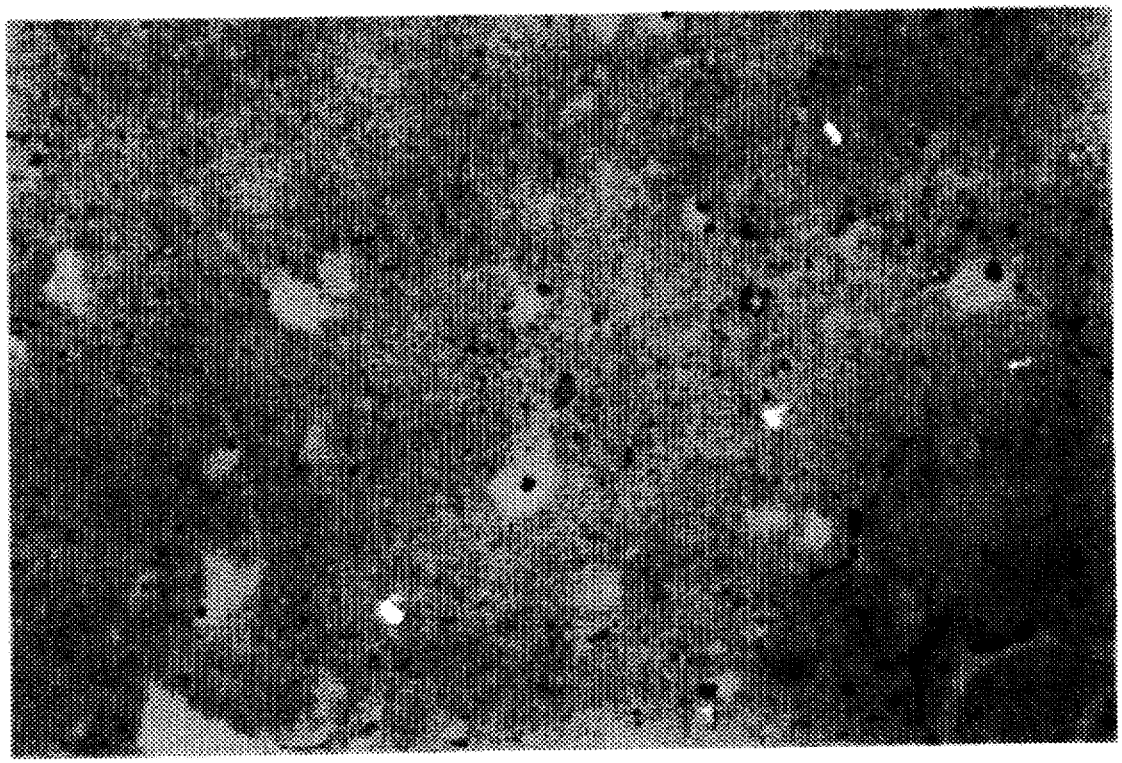
FIG. 3 shows a micrograph of a thermoformed article based on NOVON™ (a thermoforming composition) magnified 222×.

10 μm thick section made from a thermoformed article obtained from composition 5 of Example 2 (FIG. 2)

The same conditions as those used for FIG. 1 were employed for observation, photography and producing the print.

The same general conclusions as those resulting from the observation of FIG. 1 can be drawn, especially with regard to the nondestructured but only partially molten state of the starchy compound, in this case amylose-rich starch, present in the thermoformed article studied.

In the present case the persisting granules of amylose-rich starch have, logically, a mean diameter which is smaller than the granules of amylopectin-rich starch which are observed in FIG. 1.

The granules observed in the present FIG. 2 have a diameter lying generally between 10 and 30 μm, especially between 10 and 20 μm.

10 μm thick section made from a thermoformed article based or Novon™ composition (FIG. 3)

The same conditions as those used in FIG. 1 were employed for the observation, photography and obtaining the print.

From inspection of FIG. 3 it follows that no real persistence whatever of starch granules can be detected within the thermoformed article studied, said granules having undergone a complete melting or destructuring.

In addition, in this photograph there is no evidence of any component showing any residual polarization cross whatever, confirming the general state of the starchy compound as being completely molten.

We claim:

1. A biodegradable thermoformable composition comprising:

a) at least one starchy compound;

b) at least one biodegradable polyester; and c) at least one salt of an hydroxycarboxylic acid.

2. The composition of claim 1 wherein the at least one starchy compound is a natural starch.

3. The composition of claim 1 wherein the at least one starchy compound is a modified starch.

4. The composition of claim 1 wherein the at least one starchy compound is a modified starch selected from the group consisting of destructured starch, plasticized destructured starch, pregelled starch, and plasticized pregelled starch.

5. The composition of claim 1 wherein the at least one starchy compound is a modified starch selected from the group consisting of: etherified starch, esterified starch, cross-linked starch, oxidized starch, alkaline treated starch, acid hydrolyzed starch, enzyme hydrolyzed starch, and a combination thereof.

6. The composition of claim 1 wherein the at least one biodegradable polyester is polylactic acid, polyglycolic acid, polyhydroxybutyric acid, polyhydroxypropionic acid, polyhydroxyvaleric acid, a salt thereof, or a copolymer thereof.

7. The composition of claim 1 wherein the at least one biodegradable polyester is polylactic acid or a polylactate.

8. The composition of claim 1 wherein the at least one biodegradable polyester is sodium polylactate.

9. The composition of claim 1 wherein the dry-weight ratio of the at least one starchy compound to the at least one biodegradable polyester is between approximately 99/1 and 1/99.

10. The composition of claim 1 wherein the dry-weight ratio of the at least one starchy compound to the at least one biodegradable polyester is between 90/10 and 10/90.

11. The composition of claim 1 wherein the dry-weight ratio of the at least one starchy compound to the at least one biodegradable polyester is between 80/20 and 50/50.

12. The composition of claim 1 wherein the dry-weight ratio of the at least one starchy compound to the at least one biodegradable polyester is between 99/1 and 70/30.

13. The composition of claim 1 wherein the dry-weight ratio between the at least one starchy compound and the at least one biodegradable polyester is between 98/2 and 80/20.

14. The composition of claim 1 wherein the dry-weight ratio of the at least one starchy compound to the at least one biodegradable polyester is between 98/2 and 40/60.

15. The composition of claim 1 comprising 5–60 weight percent of the at least one starchy compound, 30–94 weight percent of the at least one thermoplastic polyester, and 1–10 weight percent of the at least one salt of an hydroxycarboxylic acid.

16. The composition of claim 1 wherein the at least one starchy compound has an amylopectin content of at least 70 weight percent.

17. The composition of claim 1 further comprising water.

18. The composition of claim 1 wherein the at least one starchy compound is in a partially molten state.

19. The composition of claim 1, wherein said at least one salt of an hydroxycarboxylic acid is selected from the group consisting of monohydroxy/monocarboxylic acid salts, polyhydroxy/monocarboxylic acid salts, and a combination thereof.

20. The composition of claim 19, wherein said at least one salt of an hydroxycarboxylic acid is an alkali or alkaline-earth metal salt of lactic acid, gluconic acid, maltobionic acid, lactobionic acid, or glyceric acid.

21. The composition of claim 19, wherein said at least one salt is an alkali or alkaline-earth metal salt of lactic acid.

22. The composition of claim 19, wherein said at least one salt is sodium lactate.

23. The composition of claim 1, further comprising at least one adjuvant selected from the group consisting of urea and hydrogenated sugars.

24. The composition as claimed in claim 1, further comprising at least one adjuvant selected from the group consisting of sorbitol, mannitol, maltitol, and lactitol.

25. The composition of claim 1, wherein the at least one biodegradable polyester is a thermoplastic aliphatic polyester or copolyester in which the ester functional groups are separated by linear or branched hydrocarbon groups containing more than three carbon atoms.

26. The composition of claim 1, wherein the at least one biodegradable polyester is a lactone homopolymer or copolymer.

27. The composition of claim 1, wherein the at least one biodegradable polyester is a poly-ε-caprolactone.

28. The composition of claim 1, wherein the at least one biodegradable polyester is a polyester or copolyester obtained from hydroxyalkanoates.

29. The composition of claim 4 wherein the plasticized starch includes a maximum of 50% by weight of the plasticizer.

30. The composition of claim 1, wherein the hydroxycarboxylic acid salt is an alkali or alkaline-earth metal salt obtained from lactic, glycolic, hydroxybutyric, citric, isocitric, malic, tartronic, gluconic, maltobionic, lactobionic, glucuronic, glyceric, ribonic, xylonic, galactonic, mesovalonic, tartaric, mesoxalic or glucaric acids or a combination thereof.

31. A process for making a biodegradable thermoformed article comprising thermoforming a composition including a) at least one starchy compound in a destructured or partially molten state, b) at least one biodegradable polyester, and c) at least one salt of an hydroxycarboxylic acid.

32. The process of claim 31, wherein the composition is made by combining the at least one starchy compound in a destructured or partially molten state with the at least one biodegradable polyester and the at least one salt of an hydroxycarboxylic acid.

33. The process as claimed in claim 31, wherein the composition is made by combining the at least one starchy compound, the at least one biodegradable composition, and the at least one salt of an hydroxycarboxylic acid followed by treatment to effect the at least one starchy compound in a destructured or partially molten state.

34. A biodegradable thermoformed article produced from the composition of claim 1.

35. A biodegradable thermoformed article produced from the composition of claim 4.

36. A biodegradable thermoformed article produced from the composition of claim 5.

37. A biodegradable thermoformed article produced from the composition of claim 15.

38. The biodegradable thermoformed article of claim 34 having a maximum loss factor, tan delta, at a temperature not exceeding 150° C.

39. The biodegradable composition of claim 1, wherein the at least one starchy compound is a modified starch selected from the group consisting of destructured starch or partially molten starch.

40. A biodegradable thermoformed article produced from the composition of claim 39.

41. A biodegradable thermoformable composition comprising:
   a) at least one starchy compound;
   b) at least one biodegradable polyester; and
   c) at least one salt of an hydroxycarboxylic acid selected from the group consisting of monohydroxy/monocarboxylic acid salts, polyhydroxy/monocarboxylic acid salts, and a combination thereof.

42. The composition of claim 41, wherein the at least one salt of an hydroxycarboxylic acid is an alkali or alkaline-earth metal salt of lactic acid, gluconic acid, maltobionic acid, lactobionic acid, or glyceric acid.

43. The composition of claim 41, wherein the at least one salt of an hydroxycarboxylic acid is an alkali or alkaline-earth metal salt of lactic acid.

44. The composition of claim 41, wherein the at least one salt of an hydroxycarboxylic acid is sodium lactate.

45. A biodegradable thermoformed article produced from the composition of claim 41.

* * * * *